United States Patent [19]
Pitzer

[11] Patent Number: 5,879,441
[45] Date of Patent: *Mar. 9, 1999

[54] VERY HIGHLY TRANSPARENT YELLOW IRON OXIDE PIGMENTS, A PROCESS FOR THEIR PRODUCTION AND THEIR USE

[75] Inventor: Ulrike Pitzer, Krefeld, Germany

[73] Assignee: Bayer AG, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 530,627

[22] Filed: Sep. 20, 1995

[30] Foreign Application Priority Data

Sep. 30, 1994 [DE] Germany ............ 44 34 973.4

[51] Int. Cl.$^6$ ...................................... C09C 1/22
[52] U.S. Cl. ............................ 106/456; 423/633
[58] Field of Search .................. 106/456; 423/633

[56] References Cited

U.S. PATENT DOCUMENTS

| | | | |
|---|---|---|---|
| 2,558,302 | 6/1951 | Marcot et al. | 106/460 |
| 2,558,303 | 6/1951 | Marcot et al. | 106/460 |
| 2,558,304 | 6/1951 | Marcot et al. | 106/460 |
| 3,974,267 | 8/1976 | Urban, Jr. | 423/633 |
| 4,108,787 | 8/1978 | Masaki et al. | 252/62.56 |
| 4,112,063 | 9/1978 | Buxbaum et al. | 423/633 |
| 4,256,508 | 3/1981 | Patil et al. | 106/456 |
| 4,376,656 | 3/1983 | Senda et al. | 106/419 |
| 4,806,335 | 2/1989 | Saito et al. | 423/632 |
| 5,368,640 | 11/1994 | Pitzer et al. | 106/456 |
| 5,399,278 | 3/1995 | Yamashita et al. | 252/62.56 |
| 5,451,253 | 9/1995 | Klingelhoefer et al. | 423/633 |

FOREIGN PATENT DOCUMENTS

| | | |
|---|---|---|
| 30 26 686 | 2/1982 | Germany . |
| 22 71 766 | 4/1994 | United Kingdom . |

OTHER PUBLICATIONS

Derwent Abstract AN 82–11923E/07 of DE 3026686, (Feb., 1982).

Primary Examiner—Mark L. Bell
Assistant Examiner—Scott L. Hertzog
Attorney, Agent, or Firm—Connolly & Hutz

[57] ABSTRACT

The invention relates to very highly transparent iron oxide pigments with high color saturation, to a process for their production and to their use for pigmenting paints and plastics.

10 Claims, No Drawings

VERY HIGHLY TRANSPARENT YELLOW IRON OXIDE PIGMENTS, A PROCESS FOR THEIR PRODUCTION AND THEIR USE

This invention relates to very highly transparent iron oxide pigments with high color saturation, to a process for their production and to their use for pigmenting paints and plastics.

Iron oxide pigments with an average particle size of less than 0.1 μm are known as transparent iron oxide pigments because they are transparent to visible light. Alternatively to the particle size, the specific surface is also often used as a measure of the particle size. In the case of acicular particles in particular, this measure is useful for avoiding the need to express particle sizes in various spatial directions. Powders with specific BET surfaces of more than 80 m$^2$/g may generally be regarded as transparent. Highly transparent pigments have specific surfaces of more than 100 m$^2$/g.

Transparent iron oxide pigments are used above all in the production of automotive effect lacquers, wood varnishes and for pigmenting transparent plastics.

Transparent yellow iron oxide pigments are generally synthesized by precipitation of iron(II) hydroxides or carbonates at acidic or alkaline pH values and subsequent oxidation to Fe(III) oxide hydroxides. The precipitation of yellow α-FeOOH and alkaline pH values is described in U.S. Pat. No. 2,558,303 and in U.S. Pat No. 2,558,304. The products thus produced are described and claimed in U.S. Pat. No. 2,558,302.

Production with an excess of alkali and intensive aeration leads to highly transparent pigments of which the particle fineness and transparency can be further increased by using soda instead of NaOH as the precipitant and by using nucleus modifiers, such as for example SiO$_2$ or hydroxycarboxylic acids. Unfortunately, the pigments have the disadvantage that, despite their very high transparency, they are unsaturated in color and frequently have an unwanted, partly dirty greenish and partly brownish color.

U.S. Pat. No. 3,974,267 describes a variant of the alkaline precipitation process, in which the color of the pigments is improved by nucleation with intensive aeration and buildup of the pigment with minimal aeration. However, with particle diameters of 20 nm and lengths of 200 nm (=0.2 μm), the pigments produced in this way are comparatively large and, accordingly, no longer fall within the very highly transparent range.

U.S. Pat. No. 4,256,508 describes the production of transparent yellow pigments with improved strength of color by precipitation and oxidation processes at acidic pH values, the improvement in the coloristic properties being achieved by addition of fluorides. At 1 to 100 mole-% and preferably 15 to 20 mole-%, the necessary quantity of fluorides is relatively high. To be able to produce very highly transparent pigments by precipitation and oxidation processes at acidic pH values, either nucleus modification has to be applied or sodium carbonate or ammonia has to be used as the precipitant. The method of soda precipitation is selected in the Examples of U.S. Pat. No. 4,256,508. Unfortunately, this leads to brownish pigments.

Ripening steps at the end of the pigment forming process are known in the production of opaque pigments. Ripening steps have also been described in the synthesis of transparent pigments. Thus, according to U.S. Pat. No. 4,256,508, ripening is carried out by heating for one hour at 90° C. on completion of the pigment forming process. DE-C 2 556 406 describes ripening steps in the production of nuclei for opaque pigments. However, these ripening steps take place in intermediate stages in the oxidation process when the iron(II) hydroxide is still not completely oxidized.

It has been found that highly transparent and—providing a suitable procedure is adopted—even very highly transparent yellow iron oxide pigments can be produced by precipitation processes in the acidic pH range. These pigments differ from the known highly transparent yellow pigments in the fact that they show particularly high color saturation.

The present invention also relates to a process for the production of highly transparent, yellow α-FeOOH iron oxide pigments with high color saturation comprising the steps of nucleus precipitation, nucleus oxidation, nucleus ripening and buildup of the pigment. The process is preferably carried out as follows:

a) 30 to 70% of the iron used is precipitated as iron(II) hydroxide from an iron(II) salt solution by addition of a precipitant, b) the iron(II) hydroxide precipitated is completely oxidized to fine α-FeOOH nuclei in the acidic pH range using nucleus modifiers, for example phosphates or hydroxycarboxylic acids, c) the nuclei are subsequently ripened by a heat treatment and d) the remaining iron(II) is precipitated and is also oxidized to α-FeOOH.

The intermediate step of nucleus ripening is crucial to the invention.

Iron(II) sulfate is preferably used as the iron(II) salt solution, NaOH is preferably used as the precipitant and air is preferably used as the oxidizing agent. However, other iron salts, precipitants or oxidizing agents may be used. Nucleus ripening is carried out by heating the nucleus suspension to temperatures between 50° C. and the boiling point. The ripening time is determined by the temperature, the pH value of the suspension and the particle fineness of the nucleus. It is preferably between 15 minutes and 4 hours. By comparison with the use of unripened nuclei, the ripening step leads to an improvement in the coloristic pigment properties, the transparency of the pigments being affected only slightly if at all. The fact that transparency is maintained is particularly surprising because the specific surface of the final pigments is considerably reduced by the use of ripened nuclei compared with unripened nuclei.

Since the specific surface is a measure of the particle fineness of the pigments and, in turn, critically determines transparency, any reduction in the specific surface would have been expected to result in a distinct deterioration in transparency. However, this is not the case.

The pigments with their outstanding optical properties by comparison with hitherto known transparent iron oxide pigments can be obtained by preparing extremely fine nuclei with specific BET surfaces of more than 170 m$^2$/g, ripening the nuclei and building them up into pigments with specific BET surfaces of more than 120 m$^2$/g and less than 150 m$^2$/g. Pigments with a particle fineness below 120 m$^2$/g are no longer very highly transparent whereas pigments with a particle fineness above 150 m$^2$/g do not have sufficiently high saturation. This very high particle fineness of the nuclei can be achieved by thorough stirring, by a high aeration rate and by a low viscosity of the suspension, for example through low solids contents.

The pigments obtainable in this way are distinguished by very high transparency and high color saturation. The transparency is characterized by the CIELAB color difference ΔE*$_{ab}$ between a 100 μm thick layer of lacquer pigmented with 5% by weight, based on the lacquer dry residue, and unpigmented clear lacquer against a black background. In the case of the particularly preferred pigments according to the invention, this color difference is less than 4.5 CIELAB units. The color saturation or brightness $C^*_{ab}$ is determined against a white background and, in the case of the particularly preferred pigments according to the invention, amounts to 45 CIELAB units or more. The combination of extremely high transparency and high color saturation may be regarded as new.

The pigments according to the invention are particularly suitable for pigmenting transparent paints and plastics. Accordingly, the present invention also relates to the use of the pigments according to the invention for pigmenting paints and plastics.

MEASUREMENT METHODS

The specific BET surface is determined by the $N_2$ 1-point method according to DIN 66131.

The calorimetric data are determined by completely dispersing the pigment to be tested with a content of 5% by weight, based on lacquer dry residue, in a lacquer based on Alkydal F48 (medium-oil alkyd resin based on drying vegetable fatty acids; a product of Bayer AG). Grinding for 4 hours in a planetary mill is generally sufficient for dispersion. The lacquer is poured into 100 μm cuvettes. To determine the coloristic data, the standard color values of the lacquer are measured against the white glass standard using a colorimeter with d/8 geometry. The saturation or brightness $C^*_{ab}$ is calculated in accordance with DIN 6174, light type C, 2° normal observer. To determine transparency, the same lacquer is measured against a black glass standard. The measured color difference $\Delta E^*_{ab}$ compared with the measurement of an unpigmented clear lacquer against the same black background is used as a measure of transparency. In the ideal case of completely transparent pigments, this color difference would be nil. In practice, pigments up to a color difference against black between unpigmented and pigmented lacquer of less than about 8 CIELAB units are regarded as highly transparent. Very highly transparent pigments are those in which the color difference is less than 4.5 CIELAB units.

The following Examples are intended to illustrate the invention without limiting it in any way.

EXAMPLES

Example 1

15 of an iron sulfate solution containing 150 g of $FeSO_4$/l were initially introduced at 28° C. and 2,801 g of a 25.4% NaOH solution were added over a period of 20 minutes. 34.6 g of a 57% glycolic acid solution were then added and the iron(II) hydroxide precipitated was oxidized to α-FeOOH by aeration with 800 l of air/h. The nucleus thus produced had a specific BET surface of 199 $m^2$/g. The nucleus suspension was heated to 80° C. while nitrogen was passed through and was kept at that temperature for 30 minutes with further aeration. The pH value was then adjusted to 5 and more NaOH was added at a rate of 800 l/h accompanied by aeration, the pH value being kept at pH 5. The addition of NaOH was stopped when the residual $FeSO_4$ content was less than 5 g/l. The pigment was filtered off, washed free from salt and dried.

The pigment has a specific surface of 125 $m^2$/g. It was dispersed in a lacquer based on Alkydal F48 and the calorimetric data were determined. The color difference $\Delta E^*_{ab}$ against black in relation to an unpigmented lacquer is 3.9 CIELAB units. The saturation $C^*_{ab}$ against a white background measures 45.2 CIELAB units. The measured values obtained are shown in Table 1 by comparison with those of the commercially available products Sicotrans L1915 and L1916 of BASF, Cappoxyt 4214X of Cappelle and Transoxide yellow 10-30-AC-0553 of Hilton-Davis.

Example 2

The procedure was as in Example 1, except that ripening was carried out for 30 minutes at 60° C. The finished pigment had a BET surface of 142 $m^2$/g. The color difference $\Delta E^*_{ab}$ against black in relation to an unpigmented lacquer amounts to 3.0 CIELAB units. The saturation $C^*_{ab}$ against a white background measured 45.0 CIELAB units. The measured values obtained are shown in Table 1.

Example 3

(Comparison Example)

The procedure was as in Example 1, but without the nucleus ripening step. The finished pigment had a BET surface of 162 $m^2$/g. The color difference $\Delta E^*_{ab}$ against black in relation to an unpigmented lacquer amounted to 3.7 CIELAB units. The saturation $C^*_{ab}$ against a white background measured 43.4 CIELAB units. The measured values obtained are shown in Table 1.

Example 4

(Comparison Example according to U.S. Pat. No. 2,558,302, Example 3)

44.9 g of waterglass (26.7% $SiO_2$), 3,124 g of NaOH solution (25.2%) and 7,440 ml of water were initially introduced and heated to 25° C. 10 l of an $FeSO_4$ solution containing 103 g of $FeSO_4$/l were then added with stirring, followed by stirring for 5 minutes. The precipitate was then oxidized to α-FeOOH by aeration with 50 l of air/h. On completion of oxidation, the suspension was boiled for 30 minutes. The precipitate was filtered, washed free from salt and dried.

The finished pigment had a BET surface of 202 $m^2$/g. The pigment is brownish in color. The color difference $\Delta E^*_{ab}$ against black in relation to an unpigmented lacquer amounted to 5.2 CIELAB units. The saturation $C^*_{ab}$ against a white background measured 32.4 CIELAB units. The measured values obtained are shown in Table 1.

Example 5

(Comparison Example according to U.S. Pat. No. 4,256,508)

15 l of an $FeSO_4$ solution containing 14.6 g of $FeSO_4$/l were initially introduced. 63 g of NaF were dissolved while stirring in the solution, after which the solution was heated at 20° C. 750 ml of a sodium carbonate solution with an $Na_2CO_3$ content of 167 g/l were then rapidly added. Oxidation was carried out by aeration with 800 l of air/h. The temperature was kept at 20° C. during the oxidation phase. On completion of oxidation, the suspension was ripened for 1 hour at 90° C. The pigment was then filtered off, washed free from salt and dried.

The finished pigment had a BET surface of 167 $m^2$/g. The pigment was distinctly yellower and more saturated than the pigment of Example 4, but still slightly brownish. The color different $\Delta E^*_{ab}$ against black in relation to an unpigmented lacquer amounted to 4.9 CIELAB units. The saturation $C^*_{ab}$ against a white background measured 35.1 CIELAB units. The measured values obtained are shown in Table 1.

TABLE 1

Specific surface, color saturation against white and color difference against black of various transparent yellow iron oxide pigments

| Pigment | BET (m$^2$/g) | C*$_{ab}$ against white (CIELAB units) | ΔE*$_{ab}$ against black (CIELAB units) |
|---|---|---|---|
| Example 1 | 125 | 45.2 | 3.9 |
| Example 2 | 142 | 45.0 | 3.0 |
| Example 3 (= Comparison Example with 1 and 2) | 162 | 43.4 | 3.7 |
| Example 4 (= Comparison Example with U.S. Pat. No. 2,558,302) | 202 | 32.4 | 5.2 |
| Example 5 (= Comparison Example with U.S. Pat. No. 4,256,508) | 167 | 35.1 | 4.9 |
| Sicotrans L 1915 | 112 | 42.6 | 6.4 |
| Sicotrans L 1916 | 100 | 44.3 | 5.3 |
| Cappoxyt 4214 x | 113 | 46.3 | 5.2 |
| Transoxide yellow | 111 | 41.7 | 10.0 |

What is claimed is:

1. Very highly transparent yellow iron oxide pigments defined by the following properties:
    a) a color difference αE$_{ab}$ against a black background between a 100 μm thick layer of an unpigmented clear lacquer and the lacquer pigmented with 5% by weight, based on the lacquer dry residue, of less than 4.5 CIELAB units; and
    b) measurement of the pigmented lacquer against a white background showing a saturation C*$_{ab}$ of 45 CIELAB units or more.

2. Very highly transparent yellow iron oxide pigments of the α-FeOOH modification with high color saturation produced by a process comprising:
    a) precipitating 30 to 70% of the iron from an iron (II) salt solution as iron (II) hydroxide by addition of a precipitant;
    b) oxidizing the precipitated iron (II) hydroxide to fine-particle α-FeOOH nuclei in the acidic pH range using nucleus modifiers, the specific BET surface of the nuclei being adjusted to more than 170 m$^2$/g through high aeration rates and low viscosity of the suspension;
    c) ripening the nuclei by heat treatment; and
    d) precipitating the remaining iron (II) and oxidizing it to α-FeOOH, the specific BET surface of the final pigment being more than 120 m$^2$/g and less than 150 m$^2$/g by control of the ripening time of step c).

3. Very highly transparent yellow iron oxide pigments prepared by precipitation processes in an acidic pH range and defined by the following properties:
    a) a color difference ΔE$_{ab}$ against a black background between a 100 μm thick layer of an unpigmented clear lacquer and the lacquer pigmented with 5% by weight, based on the lacquer dry residue, of less than 4.5 CIELAB units; and
    b) measurement of the pigmented lacquer against a white background showing a saturation C*$_{ab}$ of 45 CIELAB units or more.

4. The very highly transparent yellow iron oxide pigments according to claim 1, wherein the pigments have specific BET surfaces of between about 120 m$^2$/g and 150 m$^2$/g.

5. A process for the production of the pigments of claim 1, comprising the steps of nucleus precipitation from an iron (II) salt solution, nucleus oxidation, nucleus ripening and buildup of the pigment.

6. A process as claimed in claim 5, wherein
    a) 30 to 70% of the iron is precipitated as iron (II) hydroxide from an iron (II) salt solution by addition of a precipitant;
    b) the precipitated iron (II) hydroxide is completely oxidized to fine α-FeOOH nuclei in the acidic pH range using nucleus modifiers;
    c) the nuclei are ripened by a heat treatment; and
    d) the remaining iron (II) is precipitated and is also oxidized to α-FeOOH.

7. A process as claimed in claim 5, wherein ripening is carried out by heating of the nucleus suspension to temperatures between 50° C. and the boiling temperature.

8. A process as claimed in claim 6, wherein ripening is carried out by heating of the nucleus suspension to temperatures between 50° C. and the boiling temperature.

9. A process as claimed in claim 8, wherein ripening is carried out for 15 minutes to 4 hours.

10. A process for the production of the very highly transparent yellow iron oxide pigments of the α-FeOOH modification with high color saturation of claim 1, comprising:
    a) precipitating 30 to 70% of the iron from an iron (II) salt solution as iron (II) hydroxide by addition of a precipitant;
    b) oxidizing the precipitated iron (II) hydroxide to fine-particle α-FeOOH nuclei in the acidic pH range using nucleus modifiers, the specific BET surface of the nuclei being adjusted to more than 170 m$^2$/g through high aeration rates and a low viscosity of the suspension;
    c) ripening the nuclei by heat treatment; and
    d) precipitating the remaining iron (II) and oxidizing it to α-FeOOH, the specific BET surface of the final pigment being more than 120 m$^2$/g and less than 150 m$^2$/g by control of the ripening time of step c).

* * * * *

UNITED STATES PATENT AND TRADEMARK OFFICE
CERTIFICATE OF CORRECTION

PATENT NO. : 5,879,441
DATED : March 9, 1999
INVENTOR(S) : Pitzer

It is certified that error appears in the above-identified patent and that said Letters Patent is hereby corrected as shown below:

Claim 1, line 3 (column 5, line 28), change "$\propto E_{ab}$" to -- $\Delta E_{ab}$ --.

Signed and Sealed this

Twenty-first Day of September, 1999

Attest:

Q. TODD DICKINSON

*Attesting Officer*     *Acting Commissioner of Patents and Trademarks*